Jan. 30, 1923.
J. L. LAGORIO.
CAKE LIFTER.
FILED FEB. 20, 1922.
1,443,692.
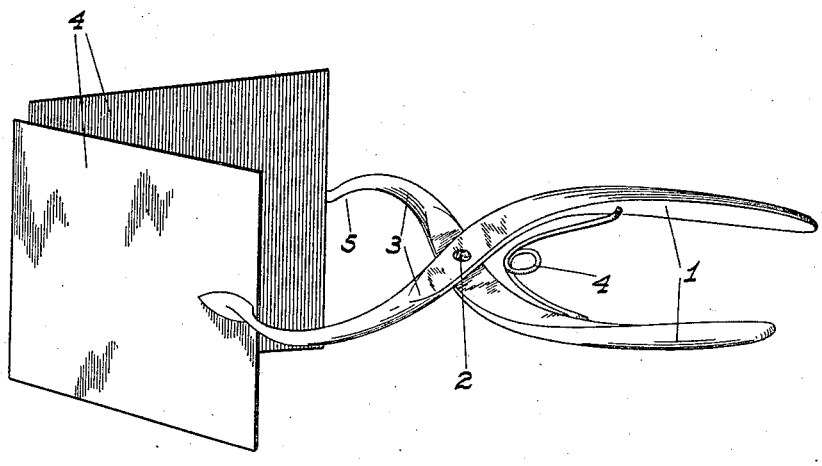
INVENTOR.
John L. Lagorio
BY
ATTORNEY Patented Jan. 30, 1923.

1,443,692

UNITED STATES PATENT OFFICE.

JOHN L. LAGORIO, OF STOCKTON, CALIFORNIA.

CAKE LIFTER.

Application filed February 20, 1922. Serial No. 537,893.

*To all whom it may concern:*

Be it known that I, JOHN L. LAGORIO, a citizen of the United States, residing at Stockton, county of San Joaquin, State of California, have invented certain new and useful Improvements in Cake Lifters; and I do declare the following to be a full, clear, and exact description of the same, reference being had to the accompanying drawings, and to the characters of reference marked thereon, which form a part of this application.

This invention relates to improvements in devices for lifting cake, and especially the triangular wedge-shaped pieces into which form a round cake is almost universally cut up; being particularly adapted and intended for use by the servitors in public eating places.

At present the cut pieces of cake are removed from the main supply and placed on the individual plates by inserting a knife or other flat bladed implement between the piece to be removed and its supporting plate, and lifted by this means from one plate to the other, the thumb of the servitor being frequently placed on top of the piece to prevent its toppling over.

Since in the cafeterias, dairy lunch places and those of a like nature, the cake is dispensed and served in full view of the patron, this method of handling the cake is objectionable to a good many, who prefer to have their food touched, at least in their sight, by no hands other than their own.

The principal object of my invention therefore is to eliminate the above described crude and objectionable method of cake serving by providing for this purpose an implement adapted to be easily manipulated by the servitor and by means of which the wedge of cake may be firmly gripped on opposite sides without being touched at any time by the hands of the servitor, and lifted from its original resting place to the individual plate for serving to the patron.

Another object is to provide gripping members for the implement so constructed that a firm hold on the cake may be had without excessive pressure being used, which will not bite into the cake so as to ruin its appearance, and which may be very easily and quickly cleaned when necessary.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

The figure on the drawings is a perspective view of the implement showing the gripping plates in their contracted position.

Referring now more particularly to the characters of reference on the drawings, the numeral 1 denotes a pair of handles, preferably pivoted together as at 2 intermediate their ends, in the manner of a pair of pliers or sscissors, and so as to leave one pair of portions 3 somewhat shorter than the other. A spring 4 of any suitable character acts to hold these portions, and also the other and actual handle members, normally spread.

Fixed to the outer ends of the portions 3 are broad, flat plates 4, positioned in planes at right angles to the plane of movement of the handle portions 3, and so alined with respect to each other that when the handles are brought together the plates will grip a triangular wedge on both sides, with the base of the triangle toward the inner end of the plates.

The angular setting of the plates may vary in different models of the implement, but since the majority of cakes is of a standard size, and the triangular pieces into which a cake is cut up are about uniform everywhere, a single stock design will probably suffice.

The handle portions 3 flare away from the plates somewhat beyond the inner ends of the latter as shown at 5, so that should the outer and wide edge of the cake-piece project beyond the plates, it will not come in contact with the relatively thin handle portions.

In operation, the servitor grips the handles and passes the plates lengthwise of the wedge of cake and along the sides thereof. By then contracting the handles, the blades firmly grip the piece of cake, and it may then be easily lifted from one plate onto another without handling the cake and without danger of its upsetting. Upon the contracting pressure on the handles being released, the plates are freed from contact with the cake, and the implement may be withdrawn at will.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent, is:—

1. A cake lifter comprising a pair of connected handles adapted to movement to and from each other at one end, and gripping means fixed on such ends at right angles to the plane of movement thereof and adapted to grasp a triangular member therebetween with the base of the triangle lying adjacent the handles.

2. A cake lifter comprising a pair of connected handles adapted to movement to and from each other at one end, and flat plates fixed on such ends at right angles to the plane of movement thereof and positioned with their outer edges closer together than the opposite ends when the handles are brought together.

3. A cake lifter comprising a pair of connected handles, adapted to movement to and from each other at one end, and flat plates fixed on such ends at right angles to the plane of movement thereof and positioned with their outer edges closer together than the opposite ends when the handles are brought together, and spring means normally tending to hold the plates apart.

In testimony whereof I affix my signature.

JOHN L. LAGORIO.